Feb. 7, 1950 — C. MOREY — 2,496,740
HYDRAULIC VALVE OPERATING MECHANISM
Filed Sept. 4, 1945
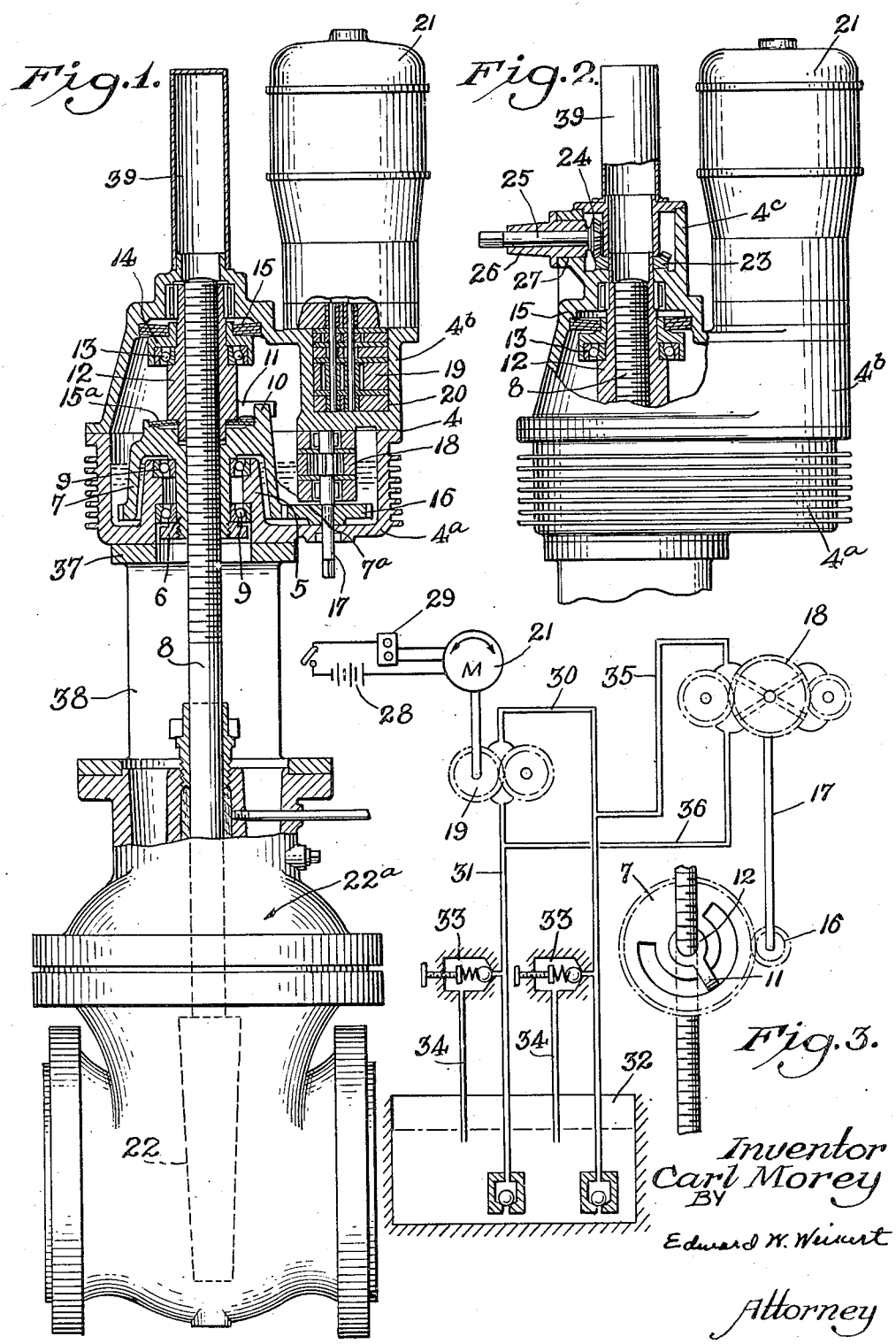
Inventor
Carl Morey
BY
Edward N. Weinert
Attorney Patented Feb. 7, 1950

2,496,740

UNITED STATES PATENT OFFICE 2,496,740

HYDRAULIC VALVE OPERATING MECHANISM

Carl Morey, Hamilton, Ohio, assignor to Economy Pumps, Inc., Hamilton, Ohio, a corporation of Illinois Application September 4, 1945, Serial No. 614,273

4 Claims. (Cl. 74—424.8)

1

This invention relates to a hydraulic valve operating mechanism that is designed for opening and closing gate valves over manholes or the like, but adapted for use for controlling various other valves of like nature.

According to this invention, the valve is rigidly attached to a screw shaft which is adapted to be elevated or lowered through its threaded relation with a rotary member driven by a gear operated by a hydraulic motor having a source of oil which also supplies lubricant for certain operating parts. The rotary member has a lost motion connection with a driving member in order to allow the starting motor to acquire sufficient speed and also to provide for an impact between the rotary member and the driving member.

Other novel features of the invention will be pointed out and become apparent as the description proceeds.

The invention comprises the novel structure and combination of parts hereinafter described and more particularly pointed out and defined in the appended claims.

In the accompanying drawing which illustrates a preferred form of this invention, and in which similar reference numerals refer to similar features in the different views:

Fig. 1 is a part sectional and part elevational view of a valve operating apparatus involving this invention;

Fig. 2 is a fragmentary sectional and elevational view of a slight modification of the invention; and Fig. 3 is a diagrammatic view of the hydraulic system for operating the apparatus.

In referring now to the drawing, there is shown a valve operating mechanism comprising a sectional housing 4 consisting of a lower oil well section 4a and an upper section 4b. The housing section 4a has an annular interior upwardly extending bearing hub 5. Within the bearing hub, there extends the sleeve hub 6 of a gear 7. The valve operating screw shaft 8 extends loosely through the sleeve 6. Ball bearings 9 are mounted between the sleeve 6 and hub 5 to provide an anti-friction bearing for the gear 7.

The gear 7 has an upwardly projecting lug 10 which is adapted for engaging a laterally extending lug 11 on the rotary screw member 12 which is in threaded relation with the shaft 8; a ball bearing 13 being provided between the rotary screw member 12 and a Z ring 14 secured to the casing section 4b by a laminated spring ring 15 which is positioned against the web of the ring. A laminated spring ring 15a between the adja-

2 cent ends of the gear 7 and rotary member 12 cooperates with spring 15 to form yielding end thrusts for rotary member 12.

The gear 7 which is of peculiar construction with its teeth on a downwardly extending skirt 7a is driven by a gear 16 secured upon the shaft 17 of a hydraulic motor 18 which may be of the type disclosed in my co-pending application Ser. No. 583,434, filed March 19, 1945, now forfeited. This hydraulic motor is adapted to be driven through oil supplied by a pump 19 which may be a gear pump or a pump of any suitable construction and which is set in a suitable well 20 formed in the section 4b of the casing. The pump 19 is adapted to be driven by a suitable electric reversing motor 21 through a suitable connection therewith. The operation of these instrumentalities will cause rotation of the rotary member 12 for raising and lowering the screw shaft 8 which is shown as attached at its lower end to a gate valve 22 or the like.

In Fig. 2, the construction is substantially the same as in Fig. 1 with the exception that the upper housing section 4c is modified to allow a gear 23 to be secured to the upper end of the rotary member 12 for engagement with a hand operated pinion 24 secured upon a shaft 25 journalled in a suitable bearing 26 inserted in a suitable bearing aperture 27 in the wall of the casing. Thus through the operation of shaft 25 through a suitable key wrench or the like, the screw shaft 8 can be raised or lowered to open or close the valve.

In Fig. 3, there is diagrammatically shown a hydraulic operating system for controlling the valve including the reversing electric motor 21 suitably connected to a source of energy 28 through a reversing switch 29. The motor 21 is adapted to drive the gear pump 19, the two sides of which are connected by pipes 30 and 31 with an oil tank 32 which corresponds to the oil chamber in the housing 4. Each pipe is connected to a relief valve 33. The relief valves discharge through pipes 34 into the oil tank 32.

The pipe 30 is connected by a pipe 35 with one side of the hydraulic motor 18 while the pipe 31 is connected by a pipe 36 with the other side of the motor. The motor drives the shaft 17 and pinion 16 which in turn drives the gear 7 having the lug 10 thereon for engaging the lug 11 on rotary member 12. When the gear 7 is rotated in one direction, it will engage one side of the lug 11 and when it is driven in the opposite direction, it will engage the other side of the lug. Thus the gear will have a lost motion of 360 degrees minus the width of the lug 11. When reversing its direction, this will allow the motor 21 to gather speed and cause the lugs 10 and 11 to engage with an impact that will start rotary member 12 very quickly and jar the valve from its seat in the event that it tends to stick.

It will be noted that when the hydraulic motor is being fed through pipe 35, the oil or fluid will escape through pipe 36 to the inlet pipe 31 and complete a circulation of the fluid and when the electric motor and pump are reversed, the oil or fluid will enter the hydraulic motor through pipe 36 and escape through pipe 35 to pipe 30 and complete circulation of the fluid.

The section 4a of the housing forms an oil tank coextensive with the housing. The oil will lubricate the ball bearings 9 and the gears 6 and 7 and other parts. The housing 4 is so designed as to contain and support all of the operative parts and is preferably supported on a base 37 at the upper end of a column 38 rising from the valve casing 22a. The housing and operating parts hence constitute a self contained unit directly supported upon the valve casing. A tube 39 may extend from the top of the housing to house the screw shaft when the same is elevated.

In operation, the instrumentalities may be operated clockwise or counterclockwise through the reversing motor 21. Such operation will cause rotation of rotary member 12 which is confined against axial movement on the screw shaft with the result that such screw shaft may be raised or lowered depending upon the direction of rotation. When the screw shaft is being lowered to close the valve, the gear lug 10 will be in engagement with one side of the lug 11. Now to open the valve, the direction of rotation of the operating members must be changed; that means that lug 10 will travel in the opposite direction away from the lug 11 until it engages the opposite side thereof. Thus there will be a lost motion somewhat less than 360 degrees. During this lost motion travel of lug 10, the motor 21 will have time to attain sufficient speed before the load is picked up, and the lug 10 will strike the lug 11 with an impact for starting rotation of the rotary member against any holding effect on the screw shaft.

It will be appreciated that the operating parts enclosed in a compact housing supported upon the valve casing produces a very simple structure requiring limited space and little effort in assembly. At the same time, a reliable and efficient operation is always assured as already pointed out.

I am aware that many changes may be made and various details of construction may be varied without departing from the principles of this invention, so I do not propose limiting the patent granted thereon otherwise than necessitated by the appended claims.

I claim as my invention:

1. In an apparatus of the class described, a threaded valve stem, a housing surrounding said stem and having a laterally offset portion, said housing having a base with an upwardly extending bearing collar surrounding said stem, a gear loosely mounted upon said stem and having a hub portion extending within said bearing collar, antifriction bearings between said bearing collar and hub, said gear having a depending skirt portion with teeth surrounding said bearing collar, a threaded member on said stem above said gear, said member and gear having coacting impact producing lugs, means for anchoring said member against axial movement, the offset portion of said housing having a fluid chamber, a hydraulic motor mounted in said chamber and operatively connected to said gear, the lower portion of said housing constituting an oil reservoir extending from said motor to said antifriction bearing and means for supplying fluid to said motor.

2. In an apparatus of the class described, a threaded valve stem, a housing surrounding said stem and having a laterally offset portion, said housing having a bearing spaced from said stem, a gear having a hub journalled between said bearing and stem and a toothed skirt surrounding said bearing, a member threaded to said stem above said gear, said member and gear having coacting lugs, the offset portion of said housing having a fluid member, a hydraulic motor mounted in said chamber, a gear on said motor in meshing relation with the skirt gear, the offset portion of said housing having a pump chamber above said motor, a pump in said pump chamber for supplying fluid to said motor and means for operating said pump upon the offset portion of said housing.

3. In an apparatus of the class described, a threaded valve stem, a housing surrounding said stem and having a laterally offset portion, said housing having a bearing at its lower end, a gear having a hub journalled against said bearing, a member threaded upon said stem above said gear, said gear and member having coacting lugs, an hydraulic motor in the offset portion of the housing and operatively connected with said gear, said housing having a pump chamber above said motor, a pump mounted in said chamber for supplying fluid to said motor, the lower portion of said housing forming an oil reservoir and means for operating said pump.

4. A housing adapted for attachment to a valve stem comprising a lower portion having an upwardly extending bearing collar from its base portion, a rotary gear having a depending hub journalled within said bearing and a depending skirt with teeth surrounding said bearing, an internally threaded tubular member above said gear, means between said gear and the upper part of said housing for confining said member against axial movement, said housing having a laterally offset portion and means in said offset portion for operating said gear.

CARL MOREY.

REFERENCES CITED

The following references are of record in the file of this patent:

UNITED STATES PATENTS

| Number | Name | Date |
|---|---|---|
| 986,780 | Sundh | Mar. 14, 1911 |
| 2,028,696 | Beckwith | Jan. 21, 1936 |